United States Patent [19]

Hattori

[11] Patent Number: 4,913,686

[45] Date of Patent: Apr. 3, 1990

[54] METHOD OF AND APPARATUS FOR CONTROLLING THE TRANSMISSION RATIO OF CONTINUOUSLY VARIABLE TRANSMISSION

[75] Inventor: Torao Hattori, Saitama, Japan

[73] Assignee: Honda Giken Kogyo Kabushiki Kaisha, Tokyo, Japan

[21] Appl. No.: 193,385

[22] Filed: May 12, 1988

[30] Foreign Application Priority Data

May 12, 1987 [JP] Japan ................. 62-116221

[51] Int. Cl.⁴ ............................................. F16H 11/02
[52] U.S. Cl. ........................................ 474/69; 474/18; 474/28
[58] Field of Search ................. 474/11, 12, 17, 18, 474/28; 74/867-869, 865

[56] References Cited

U.S. PATENT DOCUMENTS

| 3,600,961 | 12/1970 | Rattunde | 474/28 X |
| 4,519,790 | 5/1985 | Yamamuro et al. | 474/18 |
| 4,522,086 | 6/1985 | Haley | 474/18 X |
| 4,533,340 | 8/1985 | Abo et al. | 474/28 |
| 4,560,369 | 12/1985 | Hattori | 474/28 |
| 4,579,208 | 4/1986 | Nishikawa et al. | 474/18 X |
| 4,619,157 | 10/1986 | Sakai | 474/28 X |

FOREIGN PATENT DOCUMENTS 55-65755  5/1980  Japan .
60-98254  6/1985  Japan .

Primary Examiner—Thuy M. Bui
Attorney, Agent, or Firm—Lyon & Lyon

[57] ABSTRACT

A speed ratio of a continuously variable transmission is controlled by varying the effective diameters of drive and driven pulleys mounted respectively on input and output shafts with a V-belt trained around the drive and driven pulleys. The effective diameter of the drive pulley is increased based on a signal proportional to a vehicle speed and reduced based on a signal proportional to a throttle valve opening degree and a signal proportional to a speed ratio.

7 Claims, 6 Drawing Sheets

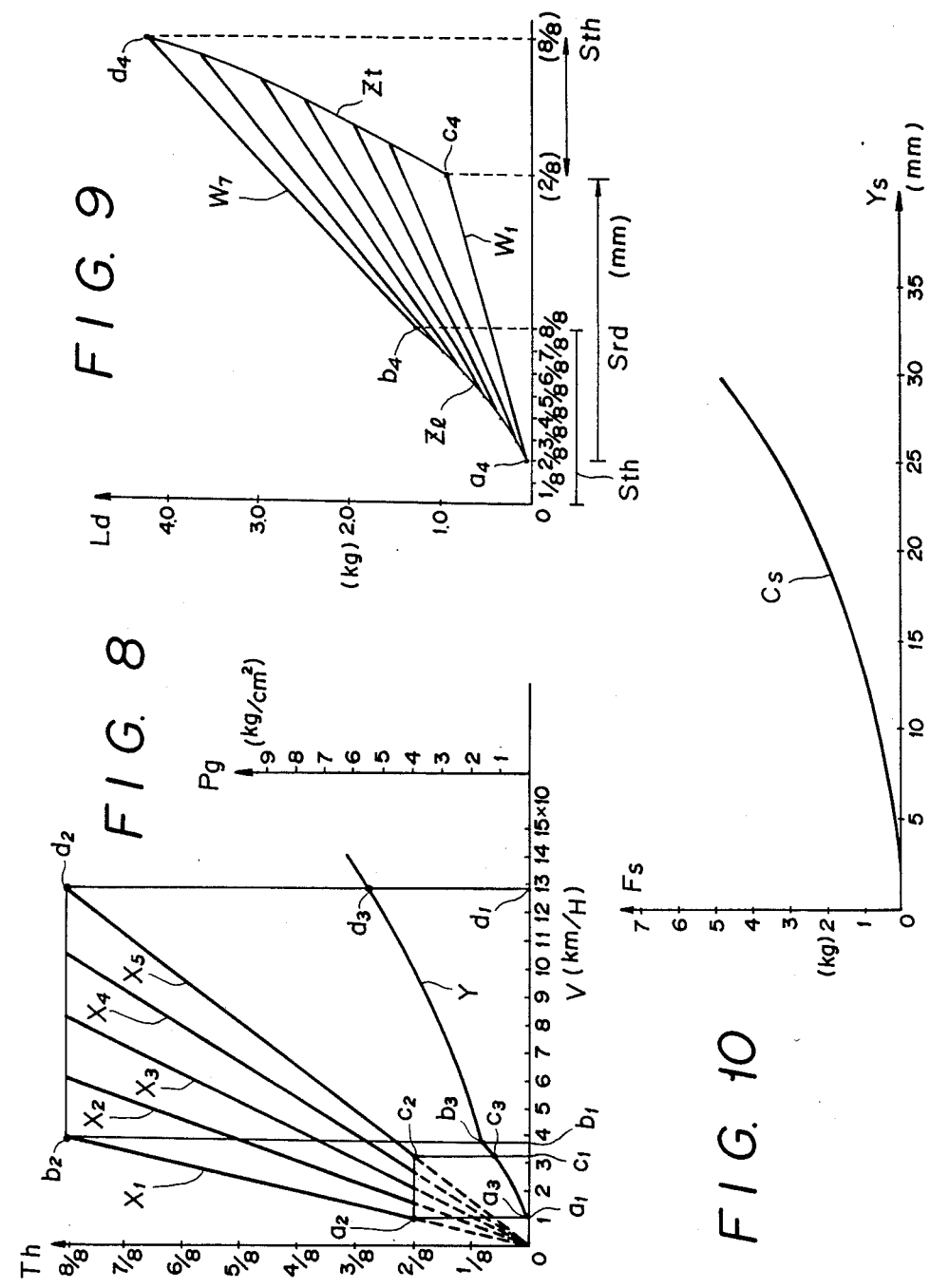

METHOD OF AND APPARATUS FOR CONTROLLING THE TRANSMISSION RATIO OF CONTINUOUSLY VARIABLE TRANSMISSION

BACKGROUND OF THE INVENTION

1. Field of the Invention:

The present invention relates to a method of an apparatus for controlling a speed ratio of a continuously variable transmission for use on a motor vehicle, and especially a continuously variable transmission having a drive pulley on an input shaft, a driven pulley on an output shaft, and a V-belt trained around the drive and driven pulleys, the effective diameters of the pulleys being controlled for continuously varying the speed ratio between the input and output shafts.

2. Description of the Relevant Art:

There have been proposed in recent years automatic transmissions of the type in which the effective diameters of drive and driven pulleys with a V-belt trained therearound are controlled to continuously control the speed ratio. The recent trend is that in such belt-and-pulley type continuously variable transmissions a throttle valve opening degree and an engine rotational speed or a drive pulley rotational speed are employed as parameters for controlling the speed ratio.

For example, Japanese Laid-Open Patent Publications No. 55-65755 laid open May 17, 1980 discloses a V-belt-and-pulley type continuously variable transmission in which a pressure of working oil supplied from a pump is regulated in relation to the rotational speed of a drive pulley and the speed ratio, and the regulated oil pressure is supplied to the hydraulic cylinder of the movable conical member of the drive pulley through a control valve that is controlled according to the drive pulley rotational speed and the throttle valve opening degree for thereby controlling the speed ratio.

Japanese Laid-Open Patent Publication No. 60-98254 laid open Jun. 1, 1985 discloses an electronically controlled continuously variable transmission having a solenoid-operated valve for selectively supplying a regulated oil pressure to the hydraulic cylinders of drive and driven pulleys, the solenoid-operated valve being controlled by a signal indicating a throttle valve opening degree and a signal indicating a drive pulley rotational speed (input shaft rotational speed). More specifically, the solenoid-operated valve is controlled based on a signal indicating a throttle valve opening degree and a signal indicating a drive pulley rotational speed with reference to a stored map.

In the disclosed control methods, the speed ratio of the continuously variable transmission is controlled such that the engine rotational speed is determined solely with respect to the throttle valve opening degree, i.e., an engine power output can be produced correspondingly to a throttle valve opening degree. These control methods are preferred when the engine always operates in a range in which fuel economy is good, and is also advantageous in that they utilize the engine rotational speed which is indispensable in order to control the clutch disposed between the engine and the continuously variable transmission.

There are instances however where the input shaft rotational speed of the transmission and hence the speed ratio suddenly changes due to a change in running conditions which is caused by an increased road gradient or a head wind, even if the driver keeps on depressing the accelerator pedal to a constant depth. In such instances, it is difficult to keep the vehicle speed at a constant level. Stated otherwise, with the aforesaid belt-and-pulley type continuously variable transmission, the driver may have an unusual feeling such that the vehicle speed does not smoothly respond to the accelerator pedal which is directly operated by the driver. This problem manifests itself particularly when the driver, who is accustomed to a conventional automatic transmission employing a torque converter, operates the belt-and-pulley type continuously variable transmission.

According to a torque-converter type automatic transmission comprising a torque converter and a control valve, as disclosed in U.S. Pat. No. 4,579,208 issued Apr. 1, 1986, a shift valve is operated dependent on a vehicle speed and a throttle valve opening degree for controlling the speed ratio at discrete steps. In the automatic transmission of this type, the throttle valve opening degree is adjusted as usual by the driver who operates the accelerator pedal in view of a vehicle speed that can be felt by the driver himself. The speed ratio and the engine rotational speed follow the throttle valve opening degree until a desired vehicle speed is finally obtained. Therefore, the driver does not have a strange feeling as to the response of the vehicle speed to the depression of the accelerator pedal.

It would be practically infeasible to realize the method of controlling the speed ratio of the above torque-converter type automatic transmission by the aforementioned belt-and-pulley type continuously variable transmissions, since many shift valves would be required when doing so.

The present invention has been made in an effort to solve the problems of the aforesaid belt-and-pulley type continuously variable transmissions.

SUMMARY OF THE INVENTION

It is an object of the present invention to provide a method of an apparatus for controlling the speed ratio of a continuously variable transmission for use on a motor vehicle such that a motor vehicle speed smoothly follow the operation of the accelerator pedal of the motor vehicle which is directly depressed by the motor vehicle driver, resulting in that the driver can control the speed ratio of the transmission without having an unusual feeling.

According to the present invention, there is provided a method for controlling a speed ratio of a continuously variable transmission having an input shaft, a drive pulley mounted on said input shaft, an output shaft, a driven pulley mounted on said output shaft, a V-belt trained around said drive and driven pulleys, by varying the effective diameters of said pulleys, said method comprising the step of: increasing the effective diameter of said drive pulley based on a signal proportional to a vehicle speed and reducing the effective diameter of said drive pulley based on a signal proportional to a throttle valve opening degree and a signal proportional to a speed ratio.

According to the present invention, there is also provided a continuously variable transmission comprising: an input shaft; a drive pulley mounted on said input shaft and comprising a stationary conical member and a movable conical member; an output shaft; a driven pulley mounted on said output shaft and comprising a stationary conical member and a movable conical member; a V-belt trained around said drive and driven pulleys; first and second hydraulic pressure chambers for axially moving said movable conical members to vary effective diameters of said drive and driven pulleys for controlling a speed ratio; an oil pressure source and an oil reservoir operatively coupled to said first and second hydraulic pressure chambers; a control valve movable in a first direction and a second direction which is operatively opposite to said first direction, for thereby operatively controlling axial movement of said movable conical member of the drive pulley and said movable conical member of the driven pulley; a first urging mechanism for applying a biasing force proportional to a vehicle speed to one end of said control valve to bias said control valve in said first direction; and a second urging mechanism for applying a biasing force proportional to a throttle valve opening degree and a biasing force proportional to the speed ratio to the other end of said control valve to bias said control valve in said second direction.

According to the present invention, there is also provided a continuously variable transmission comprising: an input shaft; a drive pulley mounted on said input shaft and comprising a stationary conical member and a movable conical member; an output shaft; a driven pulley mounted on said output shaft and comprising a stationary conical member and movable conical member; a V-belt trained around said drive and driven pulleys; an oil pressure source and an oil reservoir; a first hydraulic servomechanism comprising an output member operatively coupled to at least said movable conical member of the drive pulley, a first hydraulic pressure chamber for moving said output member, and a pilot valve movable in a first direction and a second direction which is operatively opposite to said first direction for selectively communicating said first hydraulic pressure chamber with said oil pressure source and said oil reservoir, said output member being movable in unison with said pilot valve for controlling axial movement of said movable conical members to vary effective diameters of said drive and driven pulleys for controlling a speed ratio; a first urging mechanism for applying a biasing force proportional to a vehicle speed to one end of said control valve to bias said control valve in said first direction; and a second urging mechanism for applying a biasing force proportional to a throttle valve opening degree through a spring to the other end of said control valve to bias said control valve in said second direction.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 8 is a graph simultaneously showing a relationship between throttle valve opening degree and a vehicle speed and a relationship between the vehicle speed and a governer pressure; and FIGS. 9 and 10 are graphs showing spring characteristics of a spring used in a throttle opening detecting mechanism of the transmission.

DETAILED DESCRIPTION OF THE PREFERRED EMBODIMENT

Figure 1:
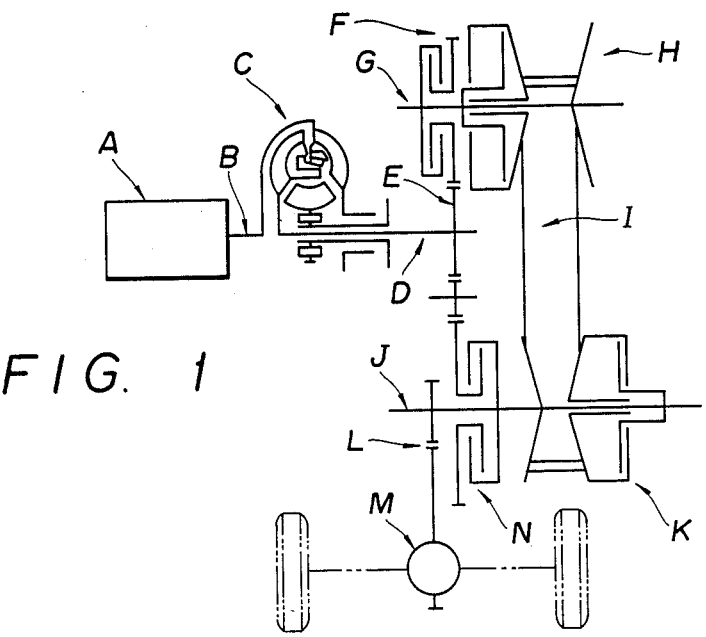
FIG. 1 is a schematic view of a power transmission system for a motor vehicle, including a belt-and-pulley type continuously variable transmission according to a preferred embodiment of the present invention.
Figure 2:
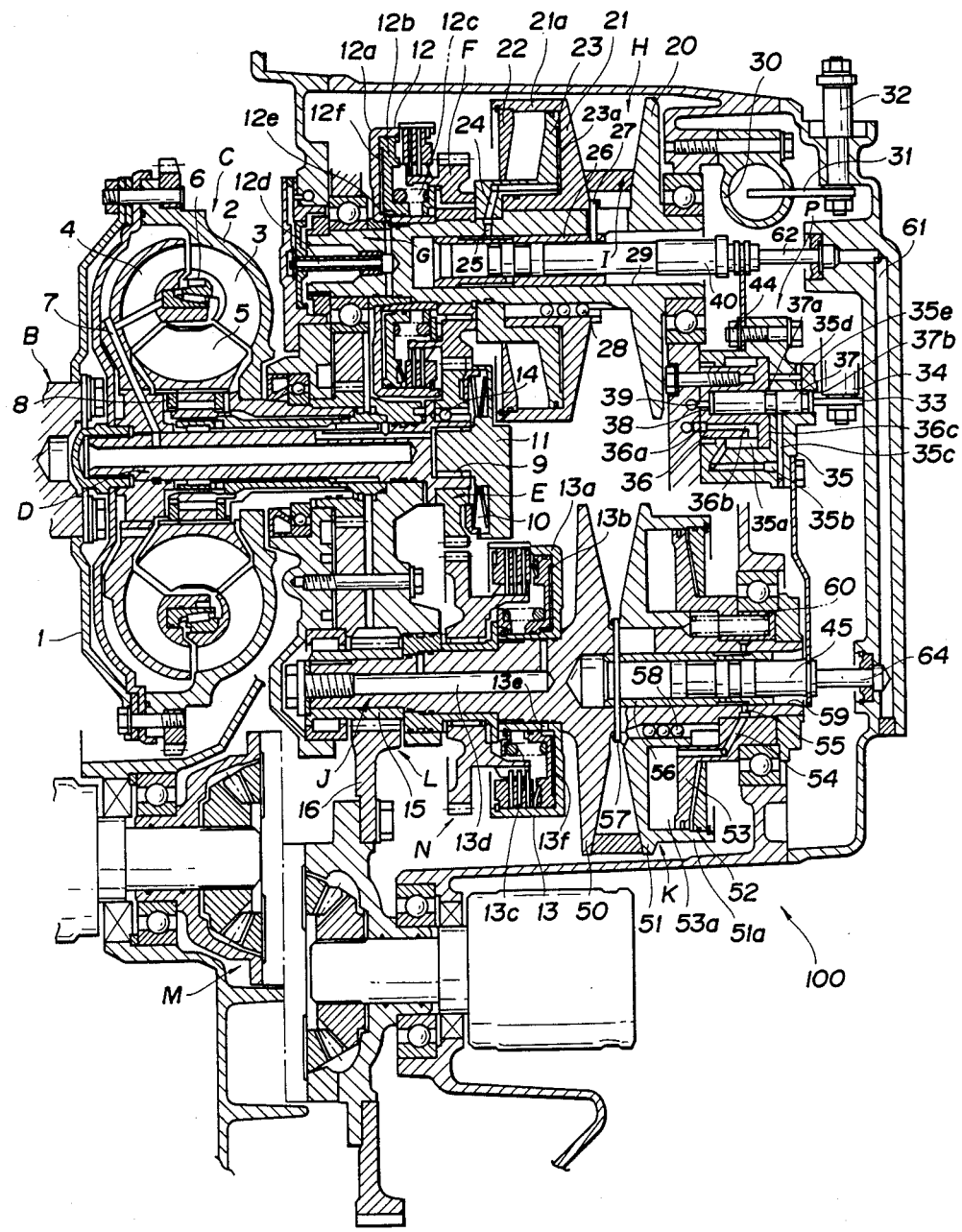
FIG. 2 is a cross-sectional view of the transmission shown in FIG. 1.

FIGS. 1 and 2 show a belt-and-pulley type continuously variable transmission, generally designated by the reference numeral 100, according to a preferred embodiment of the present invention, the transmission 100 being shown as being mounted in a motor vehicle such as an automobile.

As shown in FIG. 1, the output torque from an engine A is transmitted from an engine output shaft B via a torque converter C and its output shaft D to the transmission 100. The transmission 100 has an input gear E held in mesh with a gear F which can selectively be connected to an input shaft G by a forward clutch 12 (described later). When the clutch 12 is engaged, the torque is transmitted to a drive pulley H and then through an endless V-belt I to a driven pulley K on an output shaft J. The torque is thereafter transmitted from the output shaft J to a pair of drive road wheels W through a speed reducer mechanism L and a differential mechanism M.

The input gear E is held in mesh with an idler gear at all times which in turn meshes with a reverse gear N that can selectively be connected to the output shaft J by a reverse clutch 13 (described later). When the motor vehicle is to move in a reverse direction, the forward clutch 12 is disengaged and the reverse clutch 13 is engaged to reverse the drive road wheels W.

As illustrated in FIG. 2, the engine output shaft B is coupled to a torque converter cover 1 for rotating a support member 2 in unison which is coupled to the torque converter cover 1, the support member 2 supporting a pump impeller 3. A turbine impeller 4 is firmly coupled to the output shaft D of the torque converter C. The torque transmitted by the torque converter C is applied to the transimssion 100 via the input gear E thereof which rotates with the output shaft D. The torque converter C has a stator 5 supported on the output shaft D by a one-way clutch 8, and a lockup clutch 6. The output shaft D has an axial recess 9 defined in its rear end and in which there is fitted by a bearing a cover 11 of a torque detector mechanism 10 that generates a transmitted torque signal for regulating a pressure of working oil.

The input gear E is always in mesh with a gear F rotatably supported on the input shaft G of the transmission 100. Rotation of the gear F is transmitted to the input shaft G when the forward clutch 12 is engaged. The forward clutch 12 comprises a multiple-plate clutch having a clutch housing 12a fixed to the input shaft G and a piston 12b defining a hydraulic pressure chamber 12f in the clutch housing 12a. Pressurized oil supplied from an oil passage 12d and a port 12e axially moves the piston 12b (to the right in FIG. 2) to press friction plates in the clutch housing 12a against friction plates mounted on the gear F, so that the torque from the gear F can be transmitted via the clutch housing 12a to the input shaft G. The friction plates in the clutch housing 12a are mounted axially movably and circumferentially nonrotatably in the clutch housing 12a, and the friction plates on the gear F are mounted axially movably and circumferentially nonrotatably on the gear F. The friction plates on the gear F and the friction plates in the clutch housing 12a are alternately disposed, and are normally urged by a clutch spring 12c in a direction to disengage the clutch 12.

The drive pulley H is mounted on the input shaft G for rotation therewith. The drive pulley H comprises a stationary conical member 20 integrally formed with the input shaft G and a movable conical member 21 supported axially slidably, but nonrotatably, on the input shaft G. The endless V-belt I is trained around the drive pulley H and the driven pulley K on the output shaft J.

The movable conical member 21 has a cylinder wall 21a which cooperates with a partition 23 fixed to the input shaft G in defining a hydraulic pressure chamber 23a, the partition 23 having an oil passage 24 defined therein for supplying pressurized oil into and discharging the same from the hydraulic pressure chamber 23a. A cylinder cover 22 is attached to an end of the cylinder wall 21a. The input shaft G has a cylindrical bore 29 extending axially therethrough over a range in which the movable conical member 21 is slidable. In the bore 29, there are fitted slide valves 26, 40 for controlling the supply of pressurized oil into and the discharge of the same from the hydraulic pressure chamber 23a, and an oil pressure supply pipe 62. The movable conical member 21 can be axially moved smoothly by a ball bearing 28.

The speed reducer mechanism L includes a smaller-diameter gear 15 fixedly mounted on the output shaft J and held in mesh with a larger-diameter gear 16 of the differential mechanism M for transmitting the torque from the output shaft J to the differential mechanism M. The reverse gear N rotatably supported on the output shaft J is held in mesh with the input gear E at all times through the idler gear (not shown in FIG. 2). Rotation of the reverse gear N is selectively transmitted to the output shaft J by the reverse clutch 13. The reverse clutch 13 comprises a multiple-plate clutch having a clutch housing 13a mounted on the output shaft J, a piston 13b, a clutch spring 13c, and a hydraulic pressure chamber 13f. Pressurized oil can be supplied into the hydraulic pressure chamber 13f through an oil passage 13d defined axially in the output shaft J and a port 13e defined in the clutch housing 13a.

The driven pulley K is corotatably mounted on the output shaft J. The driven pulley K comprises a stationary conical member 50 integrally formed with the output shaft J and a movable conical member 51 supported axially slidably, but nonrotatably, on the output shaft J. The movable conical member 51 has an integral cylinder wall 51a having an end to which a cylinder cover 52 is attached. The cylinder wall 51a cooperates with a partition 53 fixed to the output shaft J in defining a hydraulic pressure chamber 53a. Several springs 60 are disposed between the partition 53 and the movable conical member 51. The movable conical member 51 can be axially moved smoothly by a ball bearing 58.

The output shaft J has a cylindrical bore 59 extending axially therethrough over a range in which the movable conical member 51 is slidable. An oil pressure supply pipe 64 and slide valves 56, 45 are fitted in the bore 59. Pressurized oil from the slide valves 45, 56 is supplied into the hydraulic pressure chamber 53a through a port 55, and an oil passage 54 defined in the partition 53.

The movable conical members 21, 51 are disposed on one side and the other side of the belt I, respectively.

A structure for controlling the effective diameters of the drive and driven pulleys H, K in response to a speed ratio varying signal based on the opening of a throttle valve and the pressure from a governor will be described below with reference to FIGS. 2 and 3.

Denoted at P is a servomechanism for producing a mechanical displacement serving as a component of the speed ratio varying signal. The servomechanism P comprises a servo piston 36 fixed to a transmission casing, a servo cylinder 35 slidably fitted over the servo piston 36, and a pilot valve 37 axially slidably disposed in bores coaxially defined in the piston 36 and the cylinder 35. The axial displacement of the pilot valve 37, i.e., the displacement of the servo cylinder 35 serves as the component of the speed ratio varying signal, as described later on.

The servo cylinder 35 and the piston 36 jointly define a hydraulic pressure chambers 35a, 36c therebetween. The servo cylinder 35 axially slides on the stationary piston 36 by a distance corresponding to the distance by which the pilot valve 37 moves. A connecting member 42 for moving the slide valve 40 of the drive pulley H is fixed to the servo cylinder 35 by means of a bolt 44, and a connecting member 47 for moving the slide valve 45 of the driven pulley K is fixed to the servo cylinder 35 by means of a bolt 49. The connecting members 42, 47, are connected to the slide valves 40, 45 at portions 41a, 46, respectively. More specifically, the slide valve 40 has an internally threaded portion at its righthand end in which a cylindrical connecting member 41 is threaded, the cylindrical connected member 41 having the portion 41a. The slide valve 40 and the connecting member 41 are fixed to each other by a nut 41b after their relative position has been adjusted. The slide valve 45 has the portion 46. The slide valve 40 of the drive H and the slide valve 45 of the driven pulley K are therefore axially movable integrally with the servo cylinder 35 of the servomechanism P.

The slide valves 26, 40, and 56, 45 fitted respectively in the axial bores 29, 59 of the input and output shafts G, J will now be described below.

The slide valves 26, 56, and 40, 45 comprise first slide valves 26, 56 coupled to respective pins 27, 57 axially slidable integrally with the movable conical members 21, 51, and second slide valves 40, 45 inserted in axial bores of the first slide valves 26, 56, respectively, and axially slidable integrally with the servo cylinder 35. The first slide valves 26, 56 have respective oil grooves 26a, 56a which are defined in outer peripheral surfaces thereof and are held in communication with oil ports 25, 55 leading to the hydraulic pressure chambers 23a, 53a at all times, and ports 26b, 56b which are defined radially inwardly of the oil grooves 26a, 56a and held in communication therewith.

The second slide valves 40, 45 have: respective oil grooves 40d, 45d which are supplied with pressurized oil from regulated oil pressure passage 61 via oil supply pipes 62, 64 and ports 63, 65, respectively; ports 40c, 45c communicating with the oil grooves 40d, 45d, respectively; and oil supply grooves 40a, 45a. The grooves 40a, 45a can be brought into communication with the ports 26b, 56b of the first slide valves 26, 56, respectively, on axial sliding movement of the second slide valves 40, 45 for supplying the regulated oil pressure from the regulated oil pressure passage 61. The second slide valves 40, 45 also have an orifice 40e and a port 45e, respectively, and oil drain grooves 40b, 45b, respectively, which can be brought into communication with the ports 26b, 56b of the first slide valves 26, 56, respectively, on axial sliding movement of the second slide valves 40, 45 for connecting the hydraulic pressure chambers 23a, 53a to oil passages 43, 48, respectively, through the orifice 40e and the port 45e.

FIGS. 4A through 4E schematically illustrate the successive postional relationships between the ports 26b, 56b of the first slide valves 26, 56, the supply grooves 40a, 45a of the second slide valves 40, 45, and the drain grooves 40b, 45b of the second slide valves 40, 45.

Figures 4A, 4B, 4C:
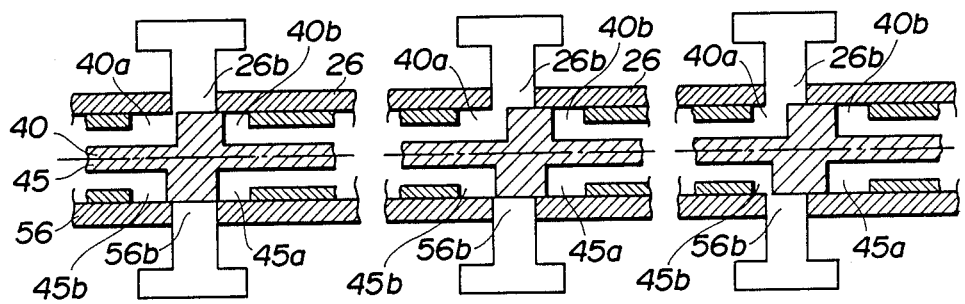
FIGS. 4A through 4E are fragmentary schematic cross-sectional views showing successive positional relationships of control valves of respective pulleys of the transmission.
Figure 3:
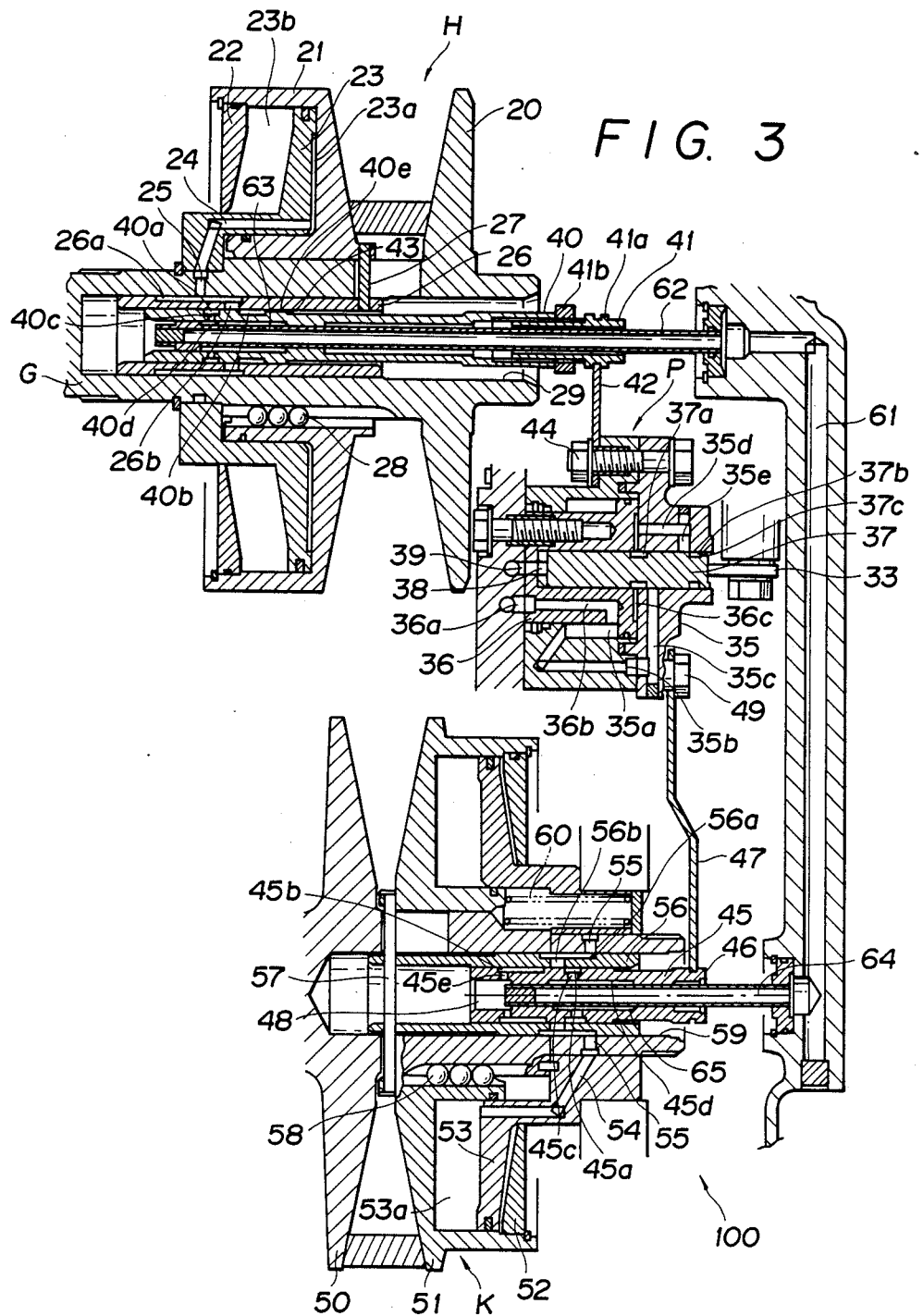
FIG. 3 is an enlarged fragmentary cross-sectional view of the transmission shown in FIG. 2.

FIGS. 4A through 4C show progressive movement to the right of the second slide valves 40, 45 from the position of FIG. 3 for a higher speed range in which the speed ratio between the drive and driven pulleys H, K is smaller. First, as shown in FIG. 4A, the oil supply groove 40a in the drive pulley H starts to communicate with the port 26b for supplying pressurized oil to the hydraulic pressure chamber 23a through the port 26 and the oil passage 24. However, at this time, the oil drain groove 45b in the driven pulley K is not yet in communication with the port 56b. Therefore, the effective diameter of the drive pulley K is not reduced, and the movable conical member 21 can not move to the right.

Then, when the second slide valves 40, 45 are continuously moved rightwardly to the position of FIG. 4B, the oil drain groove 45b starts communicating with the port 56b to release the oil in the hydraulic pressure chamber 53a. The movable conical members 21, 51 now start to move to the right.

When the second slide valves 40, 45 are further moved to the right and stopped at the position of FIG. 4C, working oil is continuously drained from the hydraulic pressure chamber 53a. The movable conical members 21, 51 are moved to the right until the oil drain groove 45b and the port 56b are brought out of communication with each other, whereupon the movable concical members 21, 51 are stopped at the position of FIG. 4D. At this time, the belt I is tensioned while the port 26b remains in communication with the oil supply groove 40a.

Figures 4D, 4E:
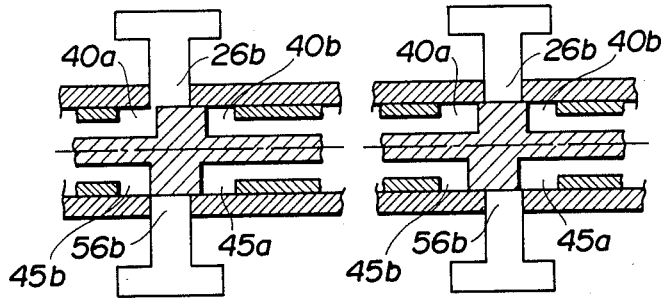

Movement to the left of the second slide valves 40, 45 from the position of FIG. 3 for a lower speed range in which the speed ratio between the drive and driven pulleys H, K is greater, will then be described below. First, as shown in FIG. 4E, the oil supply groove 45a starts communicating with the port 56b before the port 26b is brought into communication with the oil drain groove 40b. Thereafter, the regulated oil pressure is supplied to the hydraulic pressure chamber 53a and the oil pressure is drained from the hydraulic pressure chamber 23a in a manner which is a reversal of, or symmetric to, the process shown in FIGS. 4B through 4D. Therefore, the oil supply groove 45a first starts to communicate with the port 56b, and then the oil drain groove 40b starts to communicate with the port 26b, whereupon the movable conical members 21, 51 start to move to the left until finally they reach the positions of the second slide valves 40, 45.

Figure 5:
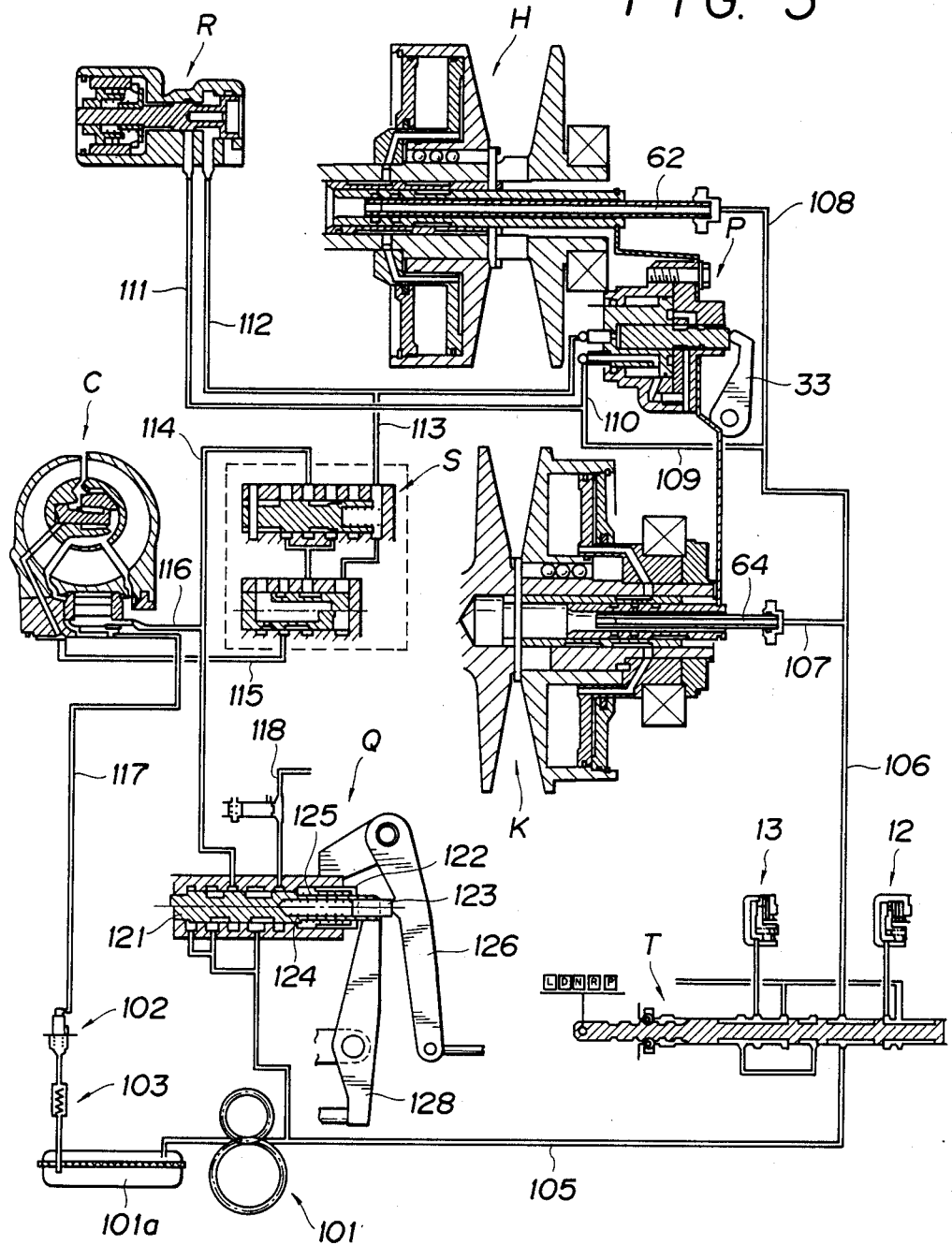
FIG. 5 is a circuit diagram of a hydraulic pressure circuit of the transmission.

FIG. 5 shows a hydraulic pressure circuit for controlling the speed ratio of the transmission 100.

The pressure of working oil supplied from an oil reservoir 101a by a pump 101 is regulated by a pressure regulating valve Q. When a manually operated valve T is operated to slide into an L position or a D position as shown, the regulated oil pressure is applied via an oil passage 105 and the manually operated valve T to the forward clutch 12 to operate the same. As a result, the output torque of the torque converter C is transmitted to the input shaft G for thereby rotating the drive pulley H.

The pressure regulating valve Q regulates the pressure of working oil in order to produce an optimum side force on the belt dependent on the torque transmitted by the transmission 100. The pressure regulating valve Q includes a slide valve 121 for controlling the amount of oil to be drained into an oil drain passage 118. The slide valve 121 of the pressure regulating valve Q is normally urged to the left by a spring 124 and an insert 123 held against a lever 126 coupled to the servo cylinder 35 by means of a rod 127. The lever 126 operatively coupled to the servo cylinder 35 is movable in response to the speed ratio of the transmission 100. The slide valve 121 is also urged to the left by a spring 125 and an inert 122 held against one end of a lever 128 which is movable in response to the input torque applied to the transmission 100. Therefore, the pressure of working oil is regulated by the pressure regulating valve Q to such a pressure that is proportional to the input torque and the speed ratio.

Figure 6:
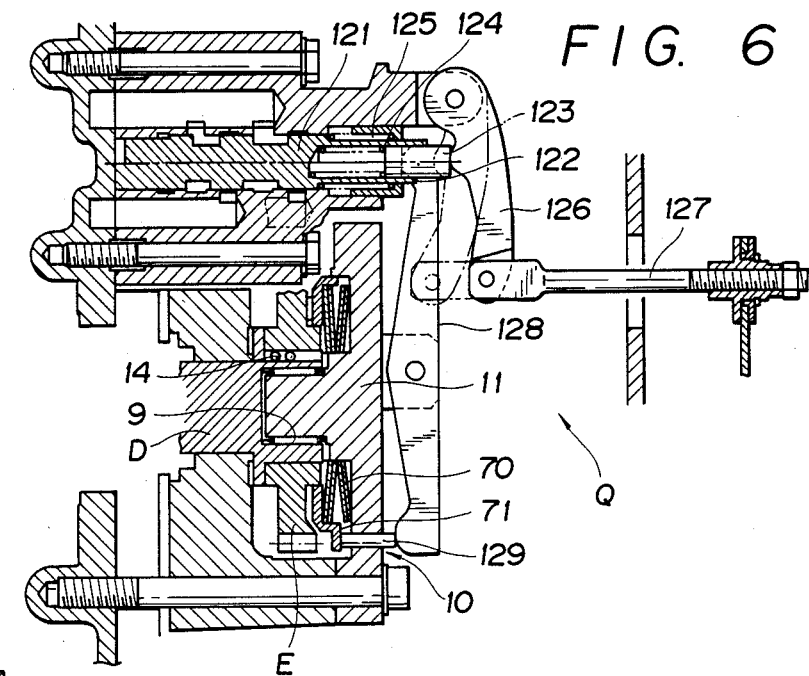
FIG. 6 is an enlarged cross-sectional view of a pressure regulating valve of the transmission.

As illustrated in FIG. 6 in detail, the lever 128 is angularly moved in proportion to the input torque by the torque detecting mechanism 10. The input gear E is constructed as a helical gear axially movably supported on an end of the output shaft D of the torque converter C by means of a bearing 14. The gear E is displaced to the right in FIG. 6 by a thrust force commensurate with the input torque. Such a displacement of the gear E is transmitted to the other end of the lever 128 by a member 71 and a pin 129. A needle bearing is disposed between the gear E and the member 71, which is normally urged toward the gear E by means of a spring 70.

The pressure regulating valve Q is not limited to the illustrated structure, but may be of any structure insofar as it can generate an oil pressure dependent on the input torque transmitted to the transmission 100. For example, the pressure regulating valve may comprise a solenoid-operated valve for regulating the pressure of working oil in response to an electric torque signal produced by a known torque sensor or the like, or in response to an engine speed signal and a speed ratio signal.

Referring back to FIG. 5, the regulated oil pressure is applied to the oil pressure supply pipe 64 of the driven pulley K through oil passages 106, 107 and also to the oil pressure supply pipe 62 of the drive pulley H through an oil passage 108, and at the same time the regulated oil pressure operates the forward clutch 12. The regulated oil pressure is also delivered into a branch passage 109 from which it is applied via an oil passage 110 to an oil pressure port 36a of the servomechanism P and also via an oil passage 111 to a governor valve R. The governor valve R comprises a valve for controlling an oil pressure by means of centrifugal forces, and is driven by the output shaft J for generating a governor oil pressure proportional to the vehicle speed. The governor oil pressure is introduced into an oil chamber 38 defined in an end of the pilot valve 37 of the servomechanism P, via an oil passage 112 and a port 39. The governor oil pressure is thus applied to the servomechanism P as a vehicle speed signal for speed ratio control.

The governor oil pressure is also supplied as a signal pressure via a branch passage 113 to a control valve S which controls the lockup clutch 6 of the torque converter C. An oil passage 114 extending from the pressure regulating valve Q supplies the regulated oil pressure to the torque converter C via a branch passage 116, and also supplies the regulated oil pressure to a hydraulic pressure chamber of the lockup clutch 6 through an oil passage 115 via the control valve S. The torque converter C has a return oil passage 117 with a check valve 102 and an oil cooler 103 therein.

As described above, the oil chamber 38 in the end of the pilot valve 37 of the servomechanism P is supplied with the vehicle speed signal, i.e., the governor oil pressure. The other end of the pilot valve 37 is urged by a lever 33 under a force proportional to the opening degree of the engine throttle valve. A mechanism U for detecting the opening degree of the engine throttle valve is fitted in a cylindrical support member 30 attached to the transmission casing.

Figure 7:
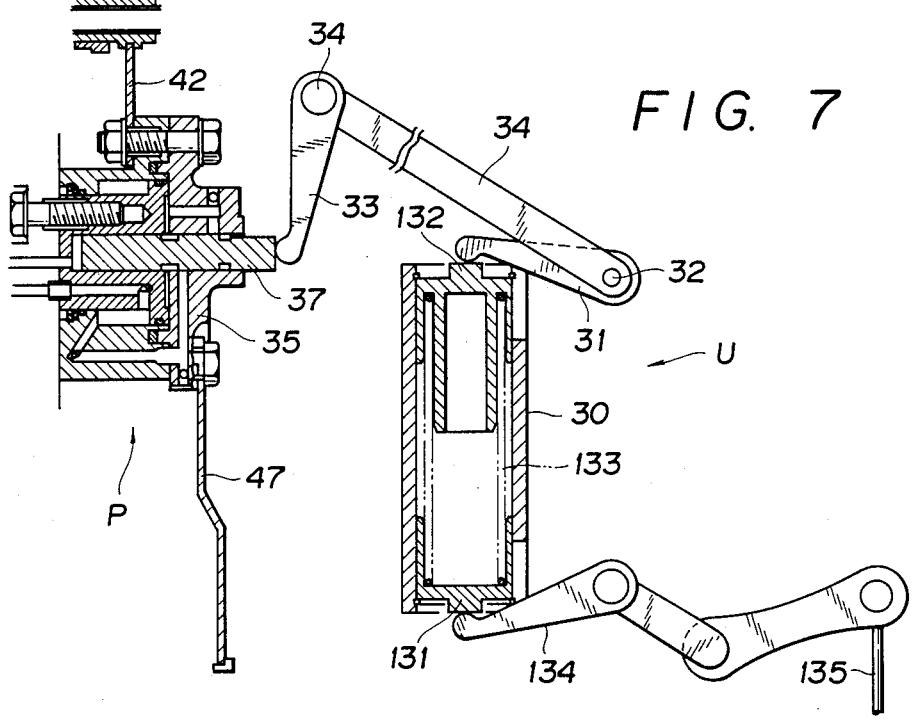
FIG. 7 is a view showing a relationship between a servomechanism and a throttle valve opening detecting mechanism of the transmission.

As illustrated in FIG. 7, the throttle valve opening detecting mechanism U comprises a cylindrical member 30, sliding members 131, 132 axially slidably inserted into the cylindrical member 30 from its opposite ends, and a spring 133 interposed between the sliding members 131, 132. The sliding member 131 is displaced axially of the member 30 by a distance proportional to the throttle valve opening degree by a lever 134 coupled by links to a rod 135 which is operatively coupled to the accelerator pedal or the throttle valve of the engine. When the sliding member 131 is axially displaced, the sliding member 132 is displaced through the spring 133 to turn a lever 31. The lever 31 is pivotally mounted on the transmission casing by means of a bolt 32. A connecting shaft 34 concentric with the bolt 32 has one end to which an end of the lever 33 held against the end of the pilot valve 37 is attached. The lever 33 is angularly moved about the shaft 34 when the lever 31 angularly moves about the connecting shaft 34. The relationship between the load on and the displacement of the spring 133 should be determined on the basis of the relationship between the throttle valve opening degree and the speed ratio characteristics. Therefore, the spring 133 should be constituted of a apring which has an appropriate spring rate, such as a coil spring of irregular pitches, or the like.

Since the lever 33 directly engages the pilot valve 37 of the servomechanism P, the throttle valve opening detecting mechanism U reacts on the pilot valve 37 dependent on the position to which the pilot valve 37 has moved. Thus, the pilot valve 37 is controlled by a vehicle speed signal, a throttle valve opening signal, and a speed ratio signal.

When the forward clutch 12 is operated by the manually operated lever T, the torque from the torque converter C is transmitted to the drive pulley H, the driven pulley K, and the output shaft J for thereby starting the motor vehicle. In FIG. 3, the effective diameter of the drive pulley H is shown as minimum, the effective diameter of the driven pulley K is shown as maximum, and hence the speed ratio is maximum (low speed range).

As the vehicle speed increases, the governor oil pressure applied to the oil chamber 38 in the end of the pilot valve 37 raises to move the pilot valve 37 to the right in FIG. 3. An oil pressure supply groove 37a in the pilot valve 37 is now connected to an oil passage 35c in the servo cylinder 35, whereupon the regulated oil pressure supplied to the oil pressure port 36a is supplied to the hydraulic pressure chamber 36c via an oil pressure 36b defined in the stationary piston 36, a hydraulic presesure chamber 35a defined in the servo cylinder 35, an oil passage 35b defined in the servo cylinder 35, the oil passage 35c, and the oil pressure supply groove 37a. As a result, the servo cylinder 35 is moved to the right. When the vehicle speed stops increasing, the pilot valve 37 is stopped in position, and so is the servo cylinder 35 in a position corresponding to the pilot valve 37. When the vehicle speed continues to increase, thus moving the pilot valve 37 further to the right, the aforesaid port 36a, passage 36b, chamber 35a, and oil passages 35b, 35c remain in communication with the oil pressure supply groove 37a, so that the servo cylinder 35 keeps on moving to the right. Therefore, the servomechanism P has its servo cylinder 35 movable by following the pilot valve 37. The rightward movement of the servo cylinder 35 is transmitted by the connecting members 42, 47 to the second slide valves 40, 45 of the drive and driven pulleys H, K, respectively, to move the second slide valves 40, 45 to the right.

When the accelerator pedal is depressed to increase the opening degree of the throttle valve while the motor vehicle is running at a constant speed, the pilot valve 37 is moved to the left in FIG. 3 by the lever 33. Therefore, an oil drain groove 37b in the pilot valve 37, which communicates with an oil drain port 37c, is connected to a port 35e in the servo cylinder 35, and the oil pressure supply groove 37a is disconnected from the oil passage 35c, whereupon pressurized oil is drained from the hydraulic pressure chamber 36c through an oil passage 35d and the port 35e into the old drain port 37c. The serve cylinder 35 is now moved to the left by a pressure buildup in the hydraulic pressure chamber 35a. The leftward movement of the servo cylinder 35 is transmitted by the connecting members 42, 47 to the second slide valves 40, 45 of the drive and driven pulleys H, K, respectively, to move the second slide valves 40, 45 to the left.

Operation of the slide valves 26, 40 and 56, 45 of the pulleys H, K shown in FIG. 3 will be described below.

When the servo cylinder 35 is moved to the right by an increase in the vehicle speed, the second slide valves 40, 45 of the drive and driven pulleys H, K are also moved to the right integrally with the servo cylinder 35. As described with reference to FIGS. 4A through 4E, the oil supply groove 40a of the second slide valve 40 of the drive pulley H first communicates with the port 26b of the first slide valve 26, for thereby supplying the regulated oil pressure into the hydraulic pressure chamber 23a of the drive pulley H. Immediately thereafter, the oil drain groove 45b, which communicates with the oil drain passage 48, of the second valve 45 of the driven pulley K communicates with the port 56b of the first slide valve 56, starting to drain pressurized oil from the hydraulic pressure chamber 53a. Therefore, the movable conical members 21, 51 now start to slide to the right through the belt I.

Since the first slide valves 26, 56 move to the right integrally with the movable conical members 21, 51, respectively, the grooves and ports referred to above remain communicating with each other as long as the second slide valves 40, 45 continue to move. After the servo cylinder 35 is stopped due to a change in the throttle valve opening signal and/or the vehicle speed signal and the second slide valves 40, 45 are stopped, the first slide valves 26, 56, slide to the right thereby to bring the grooves and ports out of communication, whereupon the rightward movement of the movable conical members 21, 51 through the belt I is interrupted. The rightward movement of the movable conical members 21, 51 increases the effective diameter of the drive pulley H, and reduces the effective diameter of the driven pulley K, so that the speed ratio is lowered (higher speed range).

In response to the righward movement of the pilot valve 37 of the servomechanism P, the spring 133 of the throttle valve opening detecting mechanism U is compressed by the lever 33 and associated members. When the opening degree of the throttle valve is increased while the speed ratio is being minimum (top speed range), the pilot valve 37 is moved to the left, and so are the second slide valve 40 of the drive pulley H and the second slide valve 45 of the driven pulley K. As described above with reference to FIGS. 4A through 4E, the oil supply groove 45a of the second slide valve 45 of the driven pulley K first communicates with the port 56b of the first slide valve 56 to supply the regulated oil pressure into the hydraulic pressure chamber 53a in the driven pulley K. Immediately thereafter, the oil drain groove 40b of the second valve 40 of the drive pulley H communicates with the port 26b of the first slide valve 26 to start to drain the pressurized oil from the hydraulic pressure chamber 23a. As the oil starts being drained, the movable conical members 21, 51 also start to slide to the left through the belt I. Since the first slide valves 26, 56 moves to the left integrally with the movable conical members 21, 51, the grooves and ports referred to above remain communicating with each other as long as the second slide valves 40, 45 continue to move. After the servo cylinder 35 is stopped by any one of the above three signals, the second slide valves are stopped, and then the first slide valves 26, 56 slide to the left thereby to bring the grooves and ports out of communication, whereupon the leftward movement of the movable conical members 21, 51 is interrupted. The leftward movement of the movable conical members 21, 51 increases the effective diameter of the driven pulley K, and reduces the effective diameter of the drive pulley H, so that the speed ratio is increased (lower speed range).

As described above, the movable conical members 21, 51 are movable by following the axial movement of the second slide valves 40, 45. In the drive pulley H, the slide valves 26, 40 jointly serve as a servomechanism with the second slide valve 40 functioning as a pilot valve of the servomechanism. Likewise, in the driven pulley K, the slide valves 56, 45 jointly serve as a servomechanism with the second slide valve 45 functioning as a pilot valve of the servomechanism.

The oil pressure to be applied to the servo cylinder 35 of the servomechanism P may be higher than the oil pressure for generating side forces onto the drive and driven pulleys, and then the movable conical members 21, 51 may be mechanically controlled for their movement by the servo cylinder 35.

The pilot valve 37 which is actuated by the oil pressure signal may be replaced with a linear solenoid-operated valve which is operable by an electric signal.

The various signals for controlling the speed ratio which are applied to the pilot valve 37 of the servomechanism P, particularly the throttle valve opening signal, will be described below with reference to FIGS. 8 through 10.

FIG. 8 shows speed ratio characteristics with respect to vehicle speeds. FIG. 8 is a synthesis of a graph illustrating the relationship between throttle valve opening degree Th and vehicle speed V by way of characteristic curves X1 through X5, and a graph showing the relationship between the vehicle speed V and governor pressure Pg by way of a characteristic curve Y. The former graph has an ordinate representative of the throttle valve opening degree Th and an abscissa representative of the vehicle speed V. The latter graph has the abscissa representative of the vehicle speed V and an ordinate representative of the governor pressure Pg. The scale of throttle valve opening degree Th is divided equally into eight levels between zero degree and fully-open degree.

In FIG. 8, the linear characteristic curve X1 (=oa2b2) is a "throttle valve opening degree vs. vehicle speed" curve assuming that the speed ratio were kept at maximum (low speed range), and the linear characteristic curve X5 (=oc2d2) is a "throttle valve opening degree vs. vehicle speed" curve assuming that the speed ratio were kept at minimum (top speed range). Since the speed ratio of the transmission 100 can be obtained continuously or infinitely within the range from the maximum to minimum values, there are theoretically an infinite number of "throttle valve opening degree vs. vehicle speed" curves between the two characteristic curves X1, X5. FIG. 8 however only shows, between the curves X1, X5, three "throttle valve opening degree vs. vehicle speed" curves X2, X3, X4 at three speed ratios which devide the range between the curves X1, X5 equally into four subranges.

The characteristic curve Y (=a1b3d3) in FIG. 8 shows the relationship between the governor pressure Pg and the vehicle speed V, the governor pressure Pg being introduced into the oil chamber 38 at the left end of the pilot valve 37 in FIG. 3.

With respect to the characteristic curve X1, when the throttle valve opening degree Th=2/8, then the vehicle speed V=a1 and hence the governor pressure Pg=a3. When the throttle valve opening degree Th=8/8 (fully open), then the vehicle speed V=b1 and hence the governor pressure Pg=b3.

With respect to the characteristic curve X5, when the throttle valve opening degree Th=2/8, then the vehicle speed V=c1 and hence the governor pressure Pg=C3. When the throttle valve opening degree Th=8/8, then the vehicle speed V=d1 and hence the governor pressure Pg=d3.

Therefore, in order to continuously vary the speed ratio smoothly from the maximum to minimum while keeping the throttle valve opening degree at Th=2/8, a biasing force which is slightly smaller than the governor pressure Pg should always be applied to the right-hand end in FIG. 3 of the pilot valve 37 by the lever 33 while the vehicle speed V is in the rrange of a1<V<c1. For example, when the speed ratio is at its maximum (X1), a biasing force a4 (FIG. 9) that is slightly smaller than the governor pressure Pg=a3 is applied to the right end of the pilot valve 37, and when the speed ratio is at its minimum (X5), a biasing force c4 (FIG. 9) that is slightly smaller than the governor pressure Pg=c3 is applied to the right end of the pilot valve 37.

Likewise, in order to continuously vary the speed ratio smoothly from the maximum to minimum while keeping the throttle valve opening degree at Th=8/8, a biasing force which is slightly smaller that the governor pressure Pg should always be applied to the right end of the pilot valve 37 by the lever 33 while the vehicle speed V is in the range of $b1 < V < d1$. For example, when the speed ratio is at its maximum (X1), a biasing force b4 (FIG. 9) that is slightly smaller than the governor pressure $Pg = b3$ is applied to the right end of the pilot valve 37, and when the speed ratio is at its minimum (X5), a biasing force d4 (FIG. 9) that is slighttly smaller than the governor pressure $Pg = d3$ is applied to the right end of the pilot valve 37.

The relationship between throttle valve opening stroke Sth and speed ratio changing stroke Srd, and biasing forces or required loads Ld to be applied to the right end of the pilot valve 37 against the governor pressure Pg is illustrated in FIG. 9. FIG. 9 shows a graph having an abscissa representative of a sum of the throttle valve opening stroke Sth and the speed ratio changing stroke Srd, and an ordinate representative of the required loads Ld. The speed ratio changing stroke Srd is a distance by which the movable conical members 21, 51 of the drive and driven pulleys move to the right from the position of FIG. 3, and hence a distance by which the pilot valve 37 moves to the right from the position of FIG. 3.

In FIG. 9, when the speed ratio continuously varies smoothly from the maximum to minimum as the speed ratio changing stroke Srd varies from zero to maximum while keeping the throttle valve opening degree at $Th = 2/8$, the required load Ld should vary along a linear characteristic curve W1 (a4c4). As described above, the required load at the point a4 is slightly smaller than the governor pressure $Pg = a3$, and the required load at the point c4 is slightly smaller than the governor pressure $Pg = c3$.

When the speed ratio continuously varies smoothly from the maximum to minimum as the speed ratio changing stroke Srd varies from zero to maximum while keeping the throttle valve opening degree at $Th = 8/8$, the required load Ld should vary along a linear characteristic curve W7 (b4d4). As described above, the required load at the point b4 is slightly smaller than the governor pressure $Pg = b3$, and the required load at the point d4 is slightly smaller than the governor pressure $Pg = d3$.

For example, with respect to the characteristic curve W1, its portion (not shown) from the origin to the point a4 results only from the throttle valve opening stroke Sth, and its real portion from the point a4 to the point c4 results only from the speed ratio changing stroke Srd.

In FIG. 9, a characteristic curve Z1 (a4b4) shows the relationship between the throttle valve opening stroke Sth and the required load Ld assuming that the speed ratio is kept at maximum (low speed range), and a characteristic curve Zt (c4d4) shows the relationship between the throttle valve opening stroke Sth and the required load Ld assuming that the speed ratio is kept at minimum (top speed range).

FIG. 10 shows a "flexure Ys vs. load Fs" characteristic curve Cs of a spring member, the curve Cs approximately containing all of the characteristics curves W1, W7, Z1, and Zt in FIG. 9, with the maximum value of the speed ratio changing stroke Srd and the maximum value of the throttle valve opening stroke Sth being appropriately selected. Likewise to the abscissa of FIG. 9, the spring flexure Ys represented by the abscissa of FIG. 10 is a sum of the speed ratio changing stroke Srd and the throttle valve opening stroke Sth. The spring 133 of the throttle valve opening detecting mechansim U shown in FIG. 7 is constituted of a spring member which has the spring characteristic Cs shown in FIG. 10, such as a coil spring of irregular pitches, or the like. Therefore, the speed ratio changing stroke Srd indicates a distance by which the pilot valve 37 of FIG. 3 moves to the right, i.e., a distance by which the sliding member 132 of FIG. 7 moves downwardly. The throttle valve opening stroke Sth indicates a distance by which the lever 134 of FIG. 7 turns, i.e., a distance by which the sliding member 131 moves upwardly. The right end of the pilot valve 37 is biased under a force based on the stroke Sth proportional to the throttle valve opening degree Th and the stroke Srd proportional to the speed ratio.

In the transmission 100, the right end of the pilot valve 37 of the servomechanism P is operatively urged by the spring 133 having the characteristics Cs shown in FIG. 10, and the left end of the pilot valve 37 is urged by the governor pressure Pg. Consequently, as can be understood from the aforesaid description with respect to FIGS. 8 through 10, if the throttle valve opening degree Th is kept at a certain level, the speed ratio smoothly varies between the maximum value (low speed range) and the minimum value (top speed range), and ideally becomes minimum (top speed range) eventually. As a result, the vehicle speed V responds smoothly to the operation of accelerator pedal which is directly depressed by the driver, who is thus prevented from having a strange or unusual feeling as to the response of the vehicle speed to the operation of accelerator pedal.

That is, the control valve or pilot valve 37 of the servomechanism P which applies a speed ratio control signal to the movable conical member 21 of the drive pulley H and the movable conical member 51 of the driven pulley K is controlled based on the vehicle speed V, the throttle valve opening degree Th, and the speed ratio. Therefore, likewise to a conventional torque-converter type automatic transmission, the vehicle speed V is controlled by the opening degree Th of the throttle valve which is directly operated by the driver, and the driver does not have any strange or unusual feeling as to the response of the vehicle speed to the operation of accelerator pedal.

The servo cylinder 35 is axially moved in unison with the axial movement of the pilot valve 37, and in turn the movable conical members 21, 51 of the drive and driven pulleys H, K are axially moved in unison with the axial movement of the servo cylinder 35. As a consequence, the speed ratio can freely be controlled based on the throttle valve opening degree Th and the vehicle speed V in any range, without requiring any particular upshift and downshift ranges.

Rather than the throttle valve opening detecting mechanism U including the spring 133, there may be employed any mechanism capable of applying the required load Ld shown in FIG. 9 based on the throttle valve opening stroke Sth and the speed ratio changing stroke Srd to the right end of the pilot valve 37 for biasing the same. One example of such mechanism is a microcomputer system having a memory storing the data map of FIG. 9 for controlling a solenoid-operated valve based on detected signals from a throttle valve opening sensor and a speed ratio sensor to produce a required oil pressure, which may be applied to the right end of the pilot valve.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A continuously variable transmission comprising:
   an input shaft;
   a drive pulley mounted on said input shaft and comprising a stationary conical member and a movable conical member;
   an output shaft;
   a driven pulley mounted on said output shaft and comprising a stationary conical member and a movable conical member;
   a V-belt trained around said drive and driven pulleys;
   an oil pressure source and an oil reservoir;
   a first hydraulic servomechanism comprising an output member operatively coupled to at least said movable conical member of the drive pulley, a first hydraulic pressure chamber for moving said output member, and a pilot valve movable in a first direction and a second direction which is operatively opposite to said first direction for selectively communicating said first hydraulic pressure chamber with said oil pressure source and said oil reservoir, said output member being movable in unison with said pilot valve for controlling axial movement of said movable conical members to vary effective diameters of said drive and driven pulleys for controlling a speed ratio;
   a first urging mechanism for applying a biasing force proportional to a vehicle speed to one end of said pilot valve to bias said pilot valve in said first direction; and
   a second urging mechanism for applying a biasing force proportional to a throttle valve opening degree through a spring to the other end of said pilot valve to bias said pilot valve in said second direction.

2. A continuously variable transmission according to claim 1, further including:
   a second hydraulic pressure chamber for moving said movable conical member of the drive pulley;
   a first slide valve coupled to said movable conical member of the drive pulley and having a port communicating at all times with said second hydraulic pressure chamber;
   a second slide valve for selectively communicating said port with said oil pressure source and said oil reservoir; and
   said second slide valve being integrally connected to said output member of the first servomechanism.

3. A continuously variable transmission according to claim 1, wherein said second urging mechanism has a lever displaceable in proportion to the throttle valve opening degree, said spring comprising a coil spring of irregular pitches interposed between said lever and said pilot valve of the first servomechanism.

4. A continuously variable transmission according to claim 1, wherein said spring has spring characteristics indicated by a characteristic curve which approximately contains "throttle valve opening degree vs. vehicle speed-dependent oil pressure" characteristic curves when the speed ratio is maximum and minimum, respectively, and "speed ratio changing stroke vs. vehicle speed-dependent oil pressure" characteristic curves when the throttle valve opening degree is full and small, respectively.

5. A continuously variable transmission according to claim 1, wherein said pilot valve moves said output member to increase the effective diameter of said drive pulley when the pilot valve moves in said first direction, and moves said output member to reduce the effective diameter of said drive pulley when the pilot valve moves in said second direction.

6. A continuously variable transmission comprising:
   an input shaft;
   a drive pulley mounted on said input shaft and comprising a stationary conical member and a movable conical member;
   an output shaft;
   a driven pulley mounted on said output shaft and comprising a stationary conical member and movable conical member;
   a V-belt trained around said drive and driven pulleys;
   an oil pressure source and an oil reservoir; and
   a first hydraulic servomechanism comprising an output member operatively coupled to at least said movable conical member of the drive pulley, a first hydraulic pressure chamber for moving said output member, and a pilot valve movable in a first direction and a second direction which is operatively opposite to said first direction for selectively communicating said first hydraulic pressure chamber with said oil pressure source and said oil reservoir, said output member being movable in unison with said pilot valve for controlling axial movement of said movable conical members to vary effective diameters of said drive and driven pulleys for controlling a speed ratio.

7. A method of controlling a speed ratio of a continuously variable transmission having an input shaft with a drive pulley having a stationary conical member and a movable conical member, an output shaft with a driven pulley having a stationary conical member and movable conical member, a V-belt trained around the drive and driven pulleys, an oil pressure source and an oil reservoir, a hydraulic servomechanism with a hydraulic chamber for causing movement of the conical member of the drive pulley, and a pilot valve movable in a first direction and a second direction which is operatively opposite to said first direction for selectively communicating said first hydraulic pressure chamber with said oil pressure source and said oil reservoir, comprising the steps of:
   applying a biasing force proportional to a vehicle speed to one end of the pilot valve to bias the pilot control valve in the first direction; and
   applying a biasing force proportional to a throttle valve opening degree through a spring to the other end of the pilot valve to bias the pilot valve in the second direction.

* * * * *